US011958693B2

United States Patent
Van Tienen et al.

(10) Patent No.: US 11,958,693 B2
(45) Date of Patent: Apr. 16, 2024

(54) TRANSPORT DEVICE, APPLICATOR AND METHOD FOR TRANSPORTING A TIRE COMPONENT

(71) Applicant: VMI HOLLAND B.V., Epe (NL)

(72) Inventors: Luuk Van Tienen, Epe (NL); Hendrik Jan Grolleman, Epe (NL); Anne-Per Joseph Hendrik Van Der Kolk, Epe (NL); Clemens Jozef Anton Elferink, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 17/802,404

(22) PCT Filed: Feb. 17, 2021

(86) PCT No.: PCT/NL2021/050103
§ 371 (c)(1),
(2) Date: Aug. 25, 2022

(87) PCT Pub. No.: WO2021/172981
PCT Pub. Date: Sep. 2, 2021

(65) Prior Publication Data
US 2023/0091822 A1    Mar. 23, 2023

(30) Foreign Application Priority Data
Feb. 25, 2020    (NL) ..................... 2024992

(51) Int. Cl.
*B65G 15/14*    (2006.01)
*B29D 30/00*    (2006.01)
(Continued)

(52) U.S. Cl.
CPC ......... *B65G 15/14* (2013.01); *B29D 30/0016* (2013.01); *B65G 39/16* (2013.01);
(Continued)

(58) Field of Classification Search
None
See application file for complete search history.

(56) References Cited

U.S. PATENT DOCUMENTS 3,844,871 A * 10/1974 Habert .................. B29D 30/24
156/406
3,852,142 A * 12/1974 Leblond ............. B29D 30/3007
156/406.2
(Continued)

FOREIGN PATENT DOCUMENTS

| CN | 101537717 | 9/2009 | ............. B29D 30/20 |
| CN | 215473235 | 1/2022 | ............. B29D 30/00 |

(Continued)

OTHER PUBLICATIONS

Japanese Decision issued in Japanese Patent Application Serial No. 2021-537070, dated Dec. 1, 2022, 5 pages, with English translation.
(Continued)

*Primary Examiner* — Kavel Singh
(74) *Attorney, Agent, or Firm* — HAYES SOLOWAY P.C.

(57) ABSTRACT

Disclosed is a transport device, an applicator and a method for transporting a tire component in a transport direction. The transport device includes at least three conveyors extending mutually parallel in the transport direction and side-by-side in a lateral direction perpendicular to the transport direction to form a combined conveying surface for conveying the tire component in the transport direction, wherein the at least three conveyors include an intermediate conveyor, a first side conveyor on a first side of the intermediate conveyor in the lateral direction and a second side conveyor on a second side of the intermediate conveyor in the lateral direction, opposite to the first side, wherein the intermediate conveyor, the first side conveyor and the second side conveyor are movable at different speeds with (Continued)

respect to each other in a direction parallel to the transport direction.

37 Claims, 7 Drawing Sheets

(51) Int. Cl.
  *B65G 39/16* (2006.01)
  *B65G 43/08* (2006.01)
(52) U.S. Cl.
  CPC ...... *B65G 43/08* (2013.01); *B29D 2030/0038* (2013.01); *B65G 2201/0273* (2013.01); *B65G 2203/0233* (2013.01); *B65G 2811/095* (2013.01)

(56) References Cited

U.S. PATENT DOCUMENTS

| | | | | |
|---|---|---|---|---|
| 4,792,372 A * | 12/1988 | Alexander | ......... | B29D 30/3007 |
| | | | | 156/394.1 |
| 5,162,036 A | 11/1992 | Peter et al. | ............ | B65G 47/31 |
| 6,984,285 B2 | 1/2006 | Nauta | ..................... | B32B 31/10 |
| 9,126,759 B2 * | 9/2015 | Wakazono | .......... | G01M 17/021 |
| 9,221,615 B2 * | 12/2015 | Bauer | ..................... | B26D 7/32 |
| 10,137,654 B2 * | 11/2018 | Slot | ........................ | B29D 30/48 |
| 10,239,701 B2 * | 3/2019 | Wicks | .................... | B25J 9/0093 |
| 10,625,332 B2 * | 4/2020 | Del Fabro | ............. | B65G 15/12 |
| 10,781,052 B2 * | 9/2020 | Fourney | ................. | B65G 43/10 |
| 10,919,723 B2 | 2/2021 | Visser et al. | ........... | B65G 23/24 |
| 2018/0111765 A1 | 4/2018 | Wicks et al. | ........... | B65G 37/00 |
| 2023/0091822 A1 | 3/2023 | Van Tienen et al. | .. | B65G 15/14 |

FOREIGN PATENT DOCUMENTS

| | | | | |
|---|---|---|---|---|
| JP | 4-213554 | 8/1992 | ............. | B65H 33/12 |
| JP | 2004-512991 | 4/2004 | ............. | B29D 30/46 |
| JP | 2019-509189 | 4/2019 | ............. | B29D 30/06 |
| WO | WO0238362 | 5/2002 | ............. | B29D 30/72 |

OTHER PUBLICATIONS

Japanese Official Action issued in Japanese Patent Application Serial No. 2021-537070, dated Sep. 27, 2022, 4 pages, with English translation.
PCT International Search Report, International Preliminary Report on Patentability and Written Opinion issued in PCT Application Serial No. PCT/NL2021/050103, dated May 14, 2021, 15 pages.
Netherlands Search Report issued in related Application NL 2024992, dated May 9, 2020, 8 pages.
First Examination Report issued in Chinese Patent Appln. Serial No. 202110204376.4, dated Mar. 10, 2023, with machine English translation, 11 pages.

* cited by examiner

TRANSPORT DEVICE, APPLICATOR AND METHOD FOR TRANSPORTING A TIRE COMPONENT

BACKGROUND

The invention relates to a transport device, an applicator and a method for transporting a tire component.

WO 02/38362 A1 discloses a splicer for splicing strips to each other. The splicer comprises a supply device having an output side for supplying the strips in a supply direction to a transport device. The transport device is adapted for transporting the strips towards a splicing unit for splicing the strips along a splice line. In an optimal configuration the transport device comprises four conveyor belts; a first conveyor belt extends from the output side of the supply device up to a first position before the splice line of the splicer and a second conveyor belt extends substantially parallel to the first conveyor belt from the output side of the supply device up to a second position between the splice line and the first position. A third conveyor belt and a fourth conveyor belt extend in line with the first conveyor belt and second conveyor belt, respectively, and next to each other and parallel one to the other, from the first and the second position, respectively, to beyond the splice line.

As a result it is possible to create transport areas of different speeds.

SUMMARY OF THE INVENTION

A disadvantage of the known transport device is that when two parallel and adjacent conveyors simultaneously support the same strip, the speed difference between the transport areas of different speeds can introduce significant deformation, i.e. wrinkling, waving or warping, of the tire component, in particular at the sudden transition between the two parallel conveyors. Consequently, it may be difficult to splice the strip consistently and/or uniformly to obtain a quality tire.

It is an object of the present invention to provide a transport device, an applicator and a method for transporting one or more tire components, wherein the consistency and/or uniformity of the tire component can be improved.

According to a first aspect, the invention provides a transport device for transporting a tire component in a transport direction, wherein the transport device comprises at least three conveyors extending mutually parallel in the transport direction and side-by-side in a lateral direction perpendicular to the transport direction to form a combined conveying surface for conveying the tire component in the transport direction, wherein the at least three conveyors comprise an intermediate conveyor, a first side conveyor on a first side of the intermediate conveyor in the lateral direction and a second side conveyor on a second side of the intermediate conveyor in the lateral direction, opposite to the first side, wherein the intermediate conveyor, the first side conveyor and the second side conveyor are movable at different speeds with respect to each other in a direction parallel to the transport direction.

The at least three conveyors can be driven at the same speed, for example when no correction of the tire component is required. However, when the geometry of the tire component deviates from a predefined geometry, one or more conveyors of the at least three conveyors can be driven at different speeds to each other in an attempt to at least partially correct the geometry of the tire component. This 'different speed' may also be a negative speed, i.e. a movement in a direction opposite to the other conveyors, as long as there is a relative speed difference. The ability to move the conveyors at different speeds may for example be relevant when the tire component is a so-called 'pre-assembly' or PA. A pre-assembly comprises an inner-liner and two side walls applied to the longitudinal side edges of the inner-liner. The application of the side walls to the inner-liner may cause the longitudinal side edges of the inner-liner to contract or elongate inconsistently, thereby causing deviations from the predefined geometry. For example, one longitudinal side edge may become longer or shorter than the other. The speed of one of the side conveyors may be increased or decreased relative to the speed of the other side conveyor during the transfer of the tire component to a downstream station, i.e. a drum, to correct the length or relative position of the deformed longitudinal side edge accordingly.

By having at least three conveyors that together form the combined conveying surface, the transition between the transport areas with different speeds can be less abrupt. In particular, if the first side conveyor and the second side conveyor are moving at different speeds, the speed of the intermediate conveyor in between can be set somewhere in between the speed of the first side conveyor and the speed of the second side conveyor, thereby effectively dividing the speed difference between the first side conveyor and the second side conveyor over the transition of the first side conveyor to the intermediate conveyor and the transition of the second side conveyor to the intermediate conveyor. As the speed difference per transition is reduced, the tire component is less likely to deform. Hence, deformation effects such as wrinkling, waving or warping in the tire component can be reduced or prevented.

In a preferred embodiment the transport device comprises a first drive member and a second drive member for driving the first side conveyor and the second side conveyor, respectively, in the transport direction. Hence, the speed of the first side conveyor and the speed of the second side conveyor can be actively controlled and/or controlled individually or independently.

In a further preferred embodiment thereof the transport device comprises a third drive member for driving the intermediate conveyor in the transport direction. Hence, the speed of the first side conveyor, the speed of the second side conveyor and the speed of the intermediate conveyor can be actively controlled and/or controlled individually or independently.

In another embodiment the first side conveyor, the second side conveyor and the intermediate conveyor each comprise a belt. A belt, in particular a conveyor belt or a timing belt, can provide a closed or substantially closed conveying surface for the tire component, thereby preventing deformation of the tire component as a result of irregularities in the conveying surface of the conveyor.

Preferably, the first side conveyor, the second side conveyor and the intermediate conveyor comprise a first side drive pulley, a second side drive pulley and an intermediate drive pulley, respectively, which are rotatable at different speeds with respect to each other. Hence, the aforementioned drive pulleys can operate and/or drive their respective conveyors independently.

More preferably, the first side drive pulley, the second side drive pulley and the intermediate drive pulley are rotatable about a common rotation axis. In other words, the aforementioned drive pulleys can be arranged coaxially and/or in-line. All of the conveyors can thus configured in substantially the same way, i.e. with the same or similar geometry, for example all ending as close as possible to or at substantially the same distance from a drum for receiving the tire component.

More preferably, the transport device further comprises a shaft for carrying the first side drive pulley, the second side drive pulley and the intermediate drive pulley at the common rotation axis, wherein one drive pulley of the first side drive pulley, the second side drive pulley and the intermediate drive pulley is fixed to the shaft to rotate together with said shaft, wherein the other two drive pulleys of the first side drive pulley, the second side drive pulley and the intermediate drive pulley are rotatable with respect to the shaft. Said one drive pulley can thus be driven directly by the shaft, while the other two drive pulleys can be driven in another way.

More preferably, the other two drive pulleys are cylindrical sleeves that fit concentrically around the shaft. The sleeves can be easily supported by the shaft while still allowing for the sleeves to be driven by a drive means external to said shaft.

In another embodiment the transport device comprises a first drive member, a second drive member and a third drive member for driving the first side conveyor, the second side conveyor and the intermediate conveyor, respectively, in the transport direction, wherein the shaft is arranged for connecting one drive member of the first drive member, the second drive member and the third drive member to one drive pulley of the first side drive pulley, the second side drive pulley and the intermediate drive pulley. Again, said one drive pulley can thus be driven directly by the shaft, while the other two drive pulleys can be driven in another way.

In another embodiment the other two drive members of the first drive member, the second drive member and the third drive member are connected to the other two drive pulleys from a position external to said shaft. The other two drive members may for example be connected to the other two drive pulleys via respective drive belts that engage onto the outside of the respective drive pulley.

In another embodiment the intermediate drive pulley is fixed to the shaft to rotate together with the shaft. The intermediate drive pulley is closely surrounded by the side drive pulleys and is therefore difficult to engage with a drive means external to said shaft. Hence, by driving the intermediate drive pulley directly with the shaft, drive means in the lateral space between the conveyors can be prevented. Hence, the conveyors can be placed closer together to form a continuous or substantially continuous combined conveying surface.

In another embodiment at least one of the first side drive pulley, the second side drive pulley and the intermediate drive pulley is rotatable about a different rotation axis than the other of the first side drive pulley, the second side drive pulley and the intermediate drive pulley. The advantage having at least one driven pulley that is not aligned with the other driven pulleys is that the drive members do not have to engage onto all of the driven pulleys at the same rotation axis. Instead, they can be placed where it is most convenient and/or such that the conveyors can be placed as close as possible to each other.

In a further embodiment the transport device comprises a control unit that is operationally connected to the first drive member and the second drive member and that is configured for controlling the first drive member and the second drive member to move the first side conveyor and the second side conveyor, respectively, at the different speeds. The control unit can be used to at least partially automate and/or control the different speeds and/or changes to said different speeds, i.e. in response to operator input or sensor signals. The control unit may for example be (pre)programmed, adapted, arranged and/or configured to execute certain steps or instructions of a program.

Preferably, the control unit is configured to operate in a first correction mode in which the first side conveyor moves faster than the second side conveyor in the transport direction and a second correction mode in which the second side conveyor moves faster than the first side conveyor in the transport direction. The highest speed can thus be alternated between conveyors depending on the corrections to be made to the tire component.

More preferably, the transport device comprises a third drive member for driving the intermediate conveyor in the transport direction, wherein the control unit is operationally connected to the third drive member, wherein the control unit is configured for controlling the third drive member to move the intermediate conveyor in the transport direction at a different speed with respect to at least one of the first side conveyor and the second side conveyor. Hence, the speed of the intermediate conveyor can be actively controlled, i.e. to slow down or accelerate a central portion of the tire component with respect to the longitudinal side edges, if so required.

In a further embodiment thereof the control unit is configured to operate in a first correction mode in which the first side conveyor moves faster than the intermediate conveyor and the second side conveyor and a second correction mode in which the second side conveyor moves faster than the intermediate conveyor and the first side conveyor. In other words, the intermediate conveyor may thus be moved at a speed equal to or different from the side conveyor with the lowest speed, yet slower than the side conveyor with the highest speed.

Additionally or alternatively, the intermediate conveyor moves faster than the second side conveyor in the first correction mode and faster than the first side conveyor in the second correction mode. In other words, while one of the side conveyors moves faster than the intermediate conveyor, the other side conveyor moves slower than the intermediate conveyor. Hence, the speed difference between the first side conveyor and the second side conveyor can be divided, preferably equally, over both transitions. Moreover, the tire component can be effectively corrected around a pivot point or central point on the intermediate conveyor.

Additionally or alternatively, the control unit is configured to operate in a third correction mode in which both the first side conveyor and the second side conveyor move faster or slower than the intermediate conveyor. Hence, both longitudinal side edges of the tire component can be corrected in the same direction relative to a central portion of the tire component supported on the intermediate conveyor, i.e. to correct a warp or curve in the leading end or the trailing end of the tire component.

In a further embodiment the transport device further comprises a sensor unit for detecting an edge of the tire component, wherein the control unit is operationally connected to the sensor unit and at least one drive member of the first drive member and the second drive member to control said at least one drive member in response to a signal received from the sensor unit. Hence, said at least one drive member can be controlled in response to an actual detection or measurement of the tire component. The control can thus be automatically adapted to the specific geometry of the tire component as detected to obtain an appropriate correction.

The edge of the tire component may be detected optically, i.e. with imaging means or a laser, or mechanically, i.e. with fingers or rollers.

Preferably, the tire component has a first longitudinal side edge and a second longitudinal side edge, wherein the sensor unit is arranged for detecting lengths of the first longitudinal side edge and the second longitudinal side edge, wherein the control unit is configured for controlling said at least one drive member to correct a difference between the lengths of the first longitudinal side edge and the second longitudinal side edge as detected. As mentioned before, this may for example be relevant when the tire component is a pre-assembly with side walls applied to the longitudinal side edges of an inner-liner.

More preferably, the sensor unit comprises a plurality of strategically placed sensors for detecting the presence and/or absence of the tire component at the location of the respective sensor. By strategically placing the sensors, i.e. distributed evenly in the lateral direction, the passage of the tire component underneath can be detected. The sensors may for example detect a height increase when a leading end of the tire component passes a respective one of the sensors and a height drop at a trailing end of the tire component.

In another embodiment the transport device further comprises one or more pressing devices arranged above the at least three conveyors for pressing the tire component onto said at least three conveyors. By pressing the tire component onto the conveyors, it can be prevented that the tire component starts to slide over the conveyors when said conveyors are moving at different speeds.

In a preferred embodiment the one or more pressing devices comprises one or more pressing rollers. The pressing rollers can roll over the tire component with less resistance while exerting a pressure force onto said tire component. The pressing rollers may be individual rollers or part of a multi-disc roller. When part of a multi-disc roller, the pressing rollers can be controlled individually or in several groups across the width of the multi-disc roller.

In a further alternative embodiment, fixed elements, such as slide shoes, or active elements, such as vacuum or magnets, may be used to locally increase or decrease friction between the tire component and the conveyor surface, i.e. by arranging magnets below the surface of said conveyor.

Preferably, each pressing device of the one or more pressing devices is arranged for pressing the tire component onto at least one conveyor of said at least three conveyors with an individually adjustable pressing force. By individually adjusting the pressing force, the friction or slip between the tire component and the conveyor surface can be variably controlled depending on the desired correction of the tire component. For example, the curvature of the leading edge of the tire component may be deformed when applying different pressing forces at different locations along its width.

In another embodiment the first side conveyor, the second side conveyor and the intermediate conveyor have a first side width, a second side width and an intermediate width, respectively, in the lateral direction, wherein the intermediate width is smaller than the first side width and the second side width. Hence, the intermediate conveyor can only support a relatively small portion or surface area of the tire component. In particular, in a case where the tire component is a pre-assembly, the side walls should be predominantly supported by the side conveyors.

In another embodiment the first side conveyor, the second side conveyor and the intermediate conveyor are spaced apart in the lateral direction over a spacing distance of less than twenty millimeters, preferably less than ten millimeters. Hence, the individual conveying surfaces of the respective conveyors can form a continuous or substantially continuous combined conveying surface for the tire component.

In another embodiment the first side conveyor, the second side conveyor and the intermediate conveyor each comprise a crowned pulley. The crowned pulleys can have a centering effect on the belts, thereby preventing misalignment and/or running off-track of said belts.

In another embodiment the transport device further comprises a first side steering member, a second side steering member and an intermediate steering member for correcting misalignment of the first side conveyor, the second side conveyor and the intermediate conveyor, respectively, in the lateral direction. The aforementioned steering members can actively correct misalignment of the respective conveyors.

In one embodiment each steering member of the first side steering member, the second side steering member and the intermediate steering member comprises a first steering roller and a second steering roller, wherein the first steering roller, the second steering roller or both are adjustable between a level orientation in which the first steering roller and the second steering roller are coaxial and parallel to the combined conveying surface, and a steering orientation in which one of the first steering roller and the second steering roller or both are arranged at an oblique angle to the combined conveying surface. By changing the orientation of at least one of the first steering roller and the second steering roller, friction can be selectively increased at one side of the conveyor to force or urge it back on track. By making the orientation of both steering rollers adjustable, the flexibility of setting the steering effect can be increased. Moreover, the shape of the guide surface formed by the combination of steering rollers can be adjusted, i.e. from a level or linear shape into a trough or a V-shape.

Alternatively, each steering of the first side steering member, the second side steering member and the intermediate steering member comprises a steering roller that is adjustable between a level orientation in which the steering roller extends parallel to the combined conveying surface and a steering orientation in which the steering roller extends at an oblique angle to the combined conveying surface. By changing the orientation of the single steering roller, the friction can be increased at one end of the steering roller and decreased at another end of the steering roller, thereby generating a steering effect between the steering roller and the belt.

In another embodiment each steering member of the first side steering member, the second side steering member and the intermediate steering member is movable in a tensioning direction transverse to the transport direction and the lateral direction for variably tensioning the respective conveyor. By increasing the tension in the belt, slacking of said belt can be reduced and/or prevented.

In another embodiment the transport device further comprises a misalignment detector for detecting misalignment of at least one conveyor of the at least three conveyors. The misalignment detector can actively and/or automatically control one or more of the steering members in case of a detected misalignment.

In another embodiment the at least three conveyors comprises one or more further conveyors, wherein the first side conveyor, the second side conveyor, the intermediate conveyor and the one or more further conveyors are movable at different speeds with respect to each other in a direction parallel to the transport direction. By having more conveyors, more transitions are introduced that can divide the speed difference between the slowest conveyor and the fastest conveyor. Moreover, the greater number of conveyors also provides for more flexibility, i.e. by creating an even greater variation in the different speeds of the various conveyors. Hence, the correction can be controlled even more locally, precisely and/or accurately.

According to a second aspect, the invention provides an applicator for applying a tire component to a drum, wherein the applicator comprises the transport device according to any one of the aforementioned embodiments. The transport device, as part of the applicator, can be used to convey the tire component towards the drum and to transfer the tire component onto the drum. In particular, when varying the speeds of the conveyors during the transfer, i.e. when the leading end of the tire component is already applied to and retained by or adhered to the drum and the trailing end of the tire component is still adhered to the transport device, the tire component can be stretched or compressed locally or in a specific region, i.e. only along one of the longitudinal side edges.

According to a third aspect, the invention provides a method for transporting a tire component in a transport direction using the transport device according to any one of the embodiments of the first aspect of the invention, wherein the method comprises the step of:
  moving the intermediate conveyor, the first side conveyor and the second side conveyor at different speeds with respect to each other in a direction parallel to the transport direction.

The method and its embodiments below relate to the practical implementation of the transport device and its respective embodiments and thus shares the same technical advantages, which will not be repeated hereafter for reasons of conciseness.

Preferably, the method further comprises the steps of:
  moving the first side conveyor faster than the second side conveyor in the transport direction in a first correction mode; and
  moving the second side conveyor faster than the first side conveyor in the transport direction in a second correction mode.

More preferably, the method further comprises the steps of:
  moving the first side conveyor faster than the intermediate conveyor in the transport direction in the first correction mode; and
  moving the second side conveyor faster than the intermediate conveyor in the transport direction in the second correction mode.

Most preferably, the method further comprises the steps of:
  moving the intermediate conveyor faster than the second side conveyor in the first correction mode; and
  moving the intermediate conveyor faster than the first side conveyor in the second correction mode.

In another embodiment the method further comprises the step of:
  moving both the first side conveyor and the second side conveyor faster or slower than the intermediate conveyor in a third correction mode.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
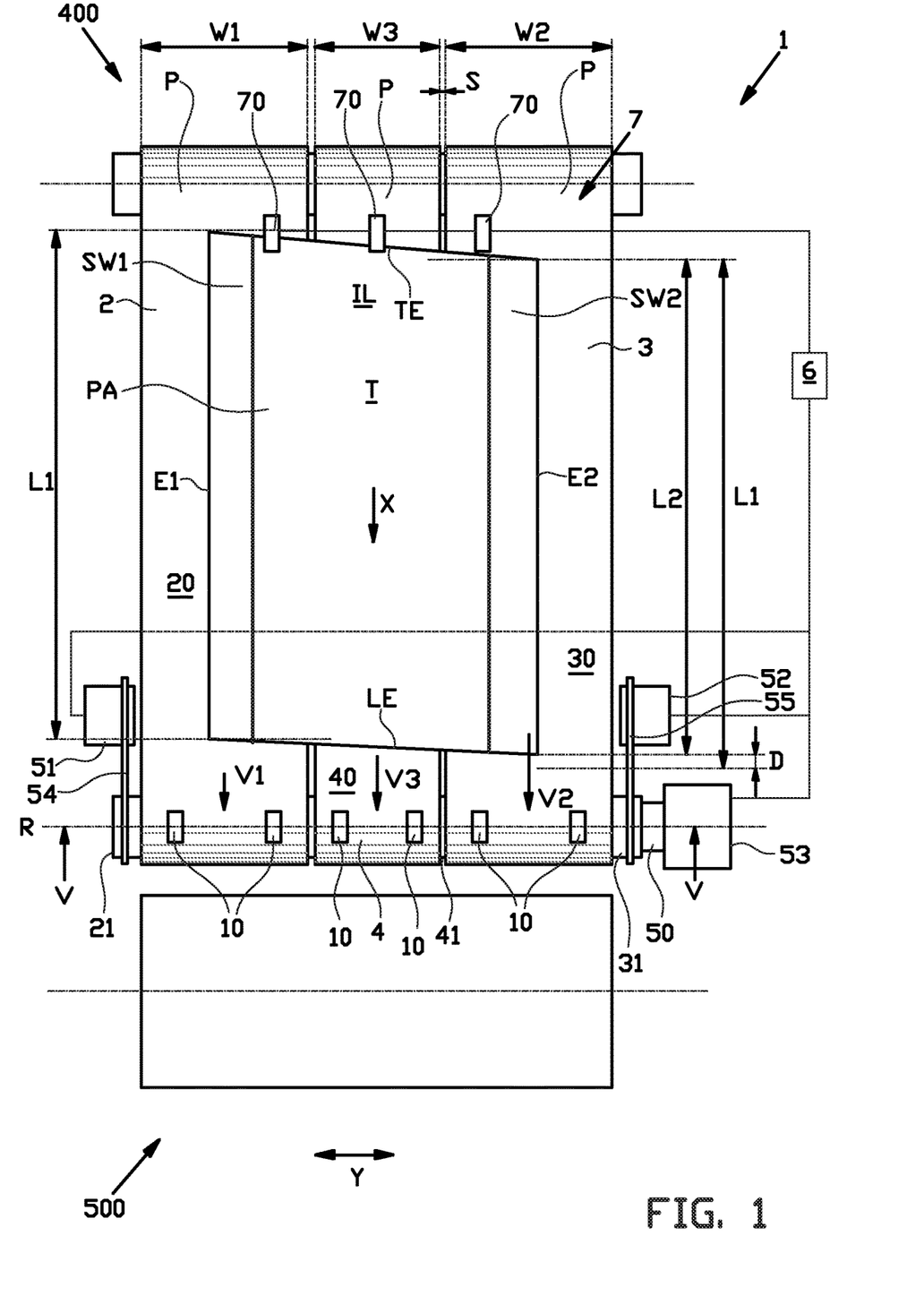
FIG. 1 shows a top view of a transport device for transporting a tire component according to a first exemplary embodiment of the invention.
Figure 2A:
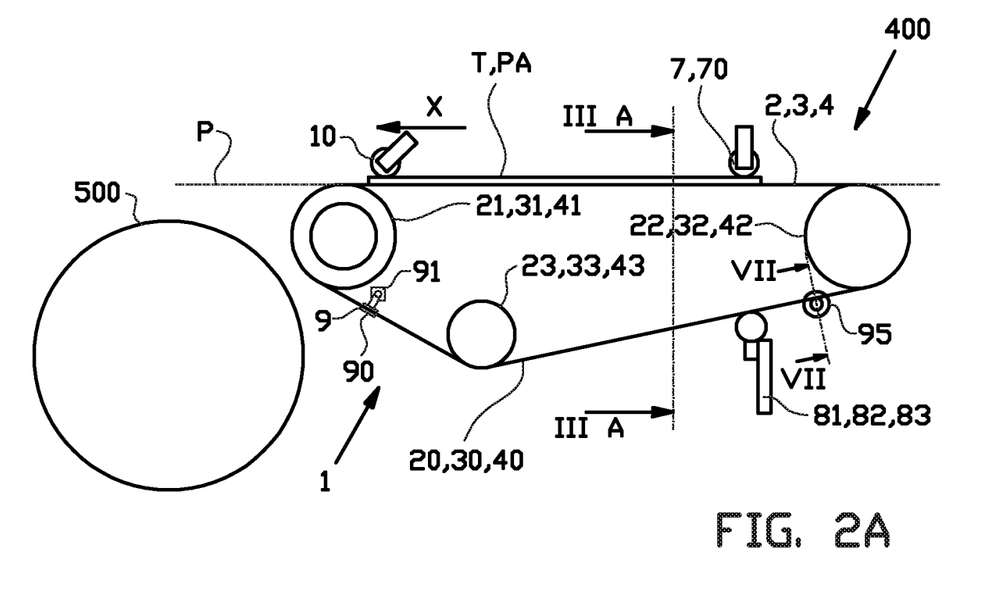
FIG. 2A shows a side view of the transport device according to FIG. 1.
Figure 2B:
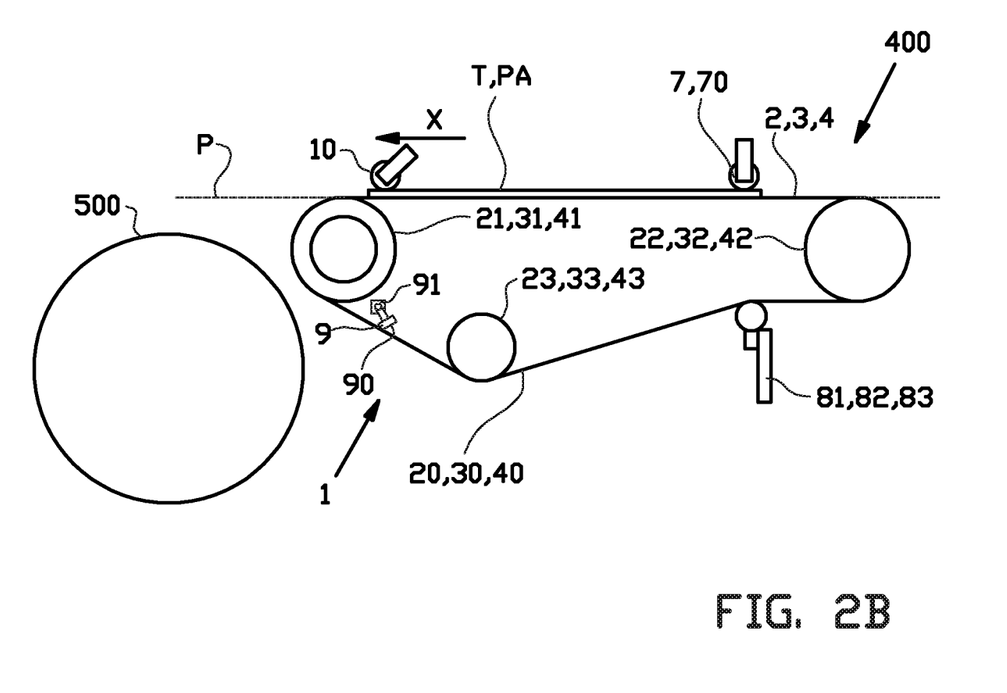
FIG. 2B shows a side view of the transport device according to FIG. 2A while one of its belts is being tensioned.

FIGS. 1, 2A and 2B show a tire component servicer or applicator 400 for applying a tire component T to a drum 500. The applicator 400 comprises a transport device 1 for transporting the tire component T in a transport direction X towards the drum 500. In this exemplary embodiment, the tire component T is a so-called 'pre-assembly' or PA, comprising an inner-liner IL with two side walls SW1, SW2 applied to it. The tire component T has a leading end LE and a trailing end TE, considered in the transport direction X, and two longitudinal side edges E1, E2 extending from the leading end LE to the trailing end TE.

As show in FIG. 1, the transport device 1 comprises an intermediate conveyor 4, a first side conveyor 2 on a first side of the intermediate conveyor 4 in the lateral direction Y and a second side conveyor 3 on a second side of the intermediate conveyor 4 in the lateral direction Y, opposite to the first side. The three conveyors 2-4 extend mutually parallel in the transport direction X and side-by-side in a lateral direction Y perpendicular to the transport direction X to form a common or combined conveying surface P for conveying the tire component T in the transport direction X. The first side conveyor 2, the second side conveyor 3 and the intermediate conveyor 4 have a first side width W1, a second side width W2 and an intermediate width W3, respectively, in the lateral direction Y. In this exemplary embodiment, the intermediate width W3 is smaller than the first side width W1 and the second side width W2. In particular, the intermediate conveyor 4 is so small that it only supports the inner-liner IL between the side walls SW1, SW2.

The three conveyors 2-4 each comprise a belt 20, 30, 40, in particular a timing belt or a conveyor belt. The belts 20-40 are spaced apart in the lateral direction Y over a spacing distance S of less than twenty millimeters, preferably less than ten millimeters. Hence, the belts 20, 30, 40 can form a closed or substantially closed and/or a continuous or a substantially continuous combined conveying surface P.

As shown in FIG. 2A, each conveyor 2-4 further comprises a head pulley 21, 31, 41 and a tail pulley 22, 32, 42 that together define the upper run or conveying run of the respective belt 20, 30, 40. Each conveyor 2-4 may further comprise one or more further pulleys 23, 33, 43 that define the lower run or return run of the respective belt 20, 30, 40. In this exemplary embodiment, the head pulleys 21, 31, 41 are the driven pulleys or drive pulleys 21, 31, 41. In particular, the first side conveyor 2, the second side conveyor 3 and the intermediate conveyor 4 comprise head pulleys 21, 31, 41 in the form of a first side drive pulley 21, a second side drive pulley 31 and an intermediate drive pulley 41, respectively. The drive pulleys 21, 31, 41 are independently or individually rotatable with respect to each other. In other words, the drive pulleys 21, 31, 41 can be rotated at different speeds with respect to each other.

As shown in FIG. 1, the first side drive pulley 21, the second side drive pulley 31 and the intermediate drive pulley 41 are rotatable about a common rotation axis R. In particular, the transport device 1 comprises a shaft 50 for carrying the first side drive pulley 21, the second side drive pulley 31 and the intermediate drive pulley 41 at the common rotation axis R. The intermediate drive pulley 41 is fixed to the shaft 50 to rotate together with said shaft 50. The two side drive pulleys 21, 31 are rotatable with respect to the shaft 50. In this exemplary embodiment, the two side drive pulleys 21, 31 are shaped as cylindrical bushes or sleeves that fit concentrically around the shaft 50. The side drive pulleys 21, 31 may be provided with bearings (not shown) between the shaft 50 and the sleeves, to facilitate the rotation. The sleeves, when fitted, may also add to the rigidity of the shaft 50.

As shown in FIG. 1, the transport device 1 comprises a first drive member 51, a second drive member 52 and a third drive member 53 for driving the first side conveyor 2, the second side conveyor 3 and the intermediate conveyor 4, respectively, in the transport direction X. In particular, the drive members 51-53 are each operationally connected or coupled to the drive pulley 21, 31, 41 of the respective conveyor 2-4. In this exemplary embodiment, the transport device 1 comprises a first drive belt 54 for connecting the first drive member 51 to the first side drive pulley 21 and a second drive belt 55 for connecting the second drive member 52 to the second side drive pulley 31. The drive belts 54, 55 engage onto the outside of the respective drive pulley 21, 31 through friction. Alternatively, the drive belts 54, 55 may be toothed drive belts meshing with corresponding teeth on the drive pulleys 21, 31. The shaft 50 is arranged for directly connecting the third drive member 53 to the intermediate drive pulley 41.

Hence, each drive pulleys 21, 31, 41 can be individually or independently controlled, moved, rotated or driven by its own drive member 51-53. The three conveyors 2-4 can thus be controlled or moved at different speeds V1, V2, V3 with respect to each other in the transport direction X.

It will be clear to one skilled in the art that other means of transmitting motion from the drive members 51-53 to the respective drive pulleys 21, 31, 41 can be envisioned. For example, the transport device 1 may comprise a stationary shaft that is fitted with three rotational drives directly at the lateral positions of the respective drive pulleys 21, 31, 41. Alternatively, the transport device 1 may be provided with one or more coupling devices for selectively tagging along with the motion one of the adjacent conveyors, i.e. by increasing or decreasing a frictional or magnetic engagement between adjacent conveyors.

As shown in FIG. 1, the transport device 1 further comprises a control unit 6 for controlling the different speeds V1, V2, V3 of the three conveyors 2-4 and a sensor unit 7 for sensing, measuring or detecting the tire component T. The control unit 6 is operationally or electronically connected to the drive members 51-53 and the sensor unit 7 for controlling the drive members 51-53 in response to signals received from the sensor unit 7.

The control unit 6 is programmed, adapted, arranged or configured for controlling the first drive member 51, the second drive member 52 and the third drive member 53 to move the first side conveyor 2 at a first speed V1, the second side conveyor 3 at a second speed V2 and the intermediate conveyor 4 at a third speed V3, respectively. The three conveyors 2-4 can be driven at the same speed, for example when no correction of the tire component T is required. However, when the geometry of the tire component T deviates from a predefined geometry, one or more conveyors of the three conveyors 2-4 can be driven at different speeds V1-V3 to each other in an attempt to at least partially correct the geometry of the tire component T. In particular, the sensor unit 7 is arranged for detecting lengths L1, L2 of the first longitudinal side edge E1 and the second longitudinal side edge E1. When there is a difference D between the lengths L1, L2, the control unit 6 is programmed, adapted, arranged or configured for controlling at least one drive member 51-53 to correct said difference D. One of the conveyors 2-4 may for example be slowed down or accelerated with respect to the other conveyors 2-4 during the transfer of the tire component T from the combined conveying surface P to the drum 500 to locally, i.e. at the position of the conveyor 2-4 with the different speed V1-V3, stretch or compress the tire component T.

The sensor unit 7 comprises a plurality of strategically placed sensors 70 for detecting the presence and/or absence of the tire component T at the location of the respective sensor 70. In particular, the plurality of sensors 70 are evenly distributed in the lateral direction Y. In this exemplary embodiment, the plurality of sensors 70 are placed above the combined conveying surface P. More in particular, as best seen in FIG. 2A, each sensor 70 comprises a finger that senses displacement as a result of the tire component T passing underneath the finger. The finger may be fitted with a roller to facilitate the passing of the tire component T underneath. Alternatively, the edges of the tire component T may be detected optically, i.e. with imaging means or a laser, or with other suitable optical, electronic or mechanical means.

Depending on the signals received from the sensors 70, the control unit 6 is configured to operate in different correction programs or modes. In a first correction mode the first side conveyor 2 moves faster than the second side conveyor 3 and/or the intermediate conveyor 4 in the transport direction X. In a second correction mode the second side conveyor 3 moves faster than the first side conveyor 2 and/or the intermediate conveyor 4 in the transport direction X. In both of the aforementioned modes, the speed V3 of the intermediate conveyor 4 may be higher than the speed V1, V2 of the slowest conveyor 2, 3. In particular, the speed V3 of the intermediate conveyor 3 is chosen somewhere between the speed V1 of the first side conveyor 2 and the speed V2 of the second side conveyor 3 so as to divide the speed difference between the speed V1 of the first side conveyor 2 and the speed V2 of the second side conveyor 3 over two transitions, compared to the single transition of the prior art. Preferably, the speed V3 of the intermediate conveyor 4 is approximately the average speed of the speed V1 of the first side conveyor 2 and the speed V2 of the second side conveyor 3.

Optionally, the control unit 6 may be programmed, adapted, arranged or configured to operate in a third correction mode in which both the first side conveyor 2 and the second side conveyor 3 move faster or slower than the intermediate conveyor 4. This may for example be useful to correct a warp or curve in the leading end LE or the trailing end TE of the tire component T.

As shown in FIGS. 1, 2A and 2B, the transport device 1 further comprises a plurality of pressing rollers 10 arranged above the at three conveyors 2-4 for pressing the tire component T onto the conveyors 2-4. By pressing the tire component T onto the conveyors 2-4, it can be prevented that the tire component T starts to slide over the conveyors 2-4 when said conveyors 2-4 are moving at the different speeds V1-V3. In this exemplary embodiment, the pressing rollers 10 are individual pressing rollers. Alternatively, one or more multidisc rollers, known per se, may be used to exert a pressing force onto the tire component T. As best seen in the cross section of FIG. 3A, the tail pulleys 22, 32, 42 are crowned to generate a steering effect or a centering effect on the respective belts 20, 30, 40. Hence, the conveyors 2-4 can be kept on track in the lateral direction Y.

Figure 3A:
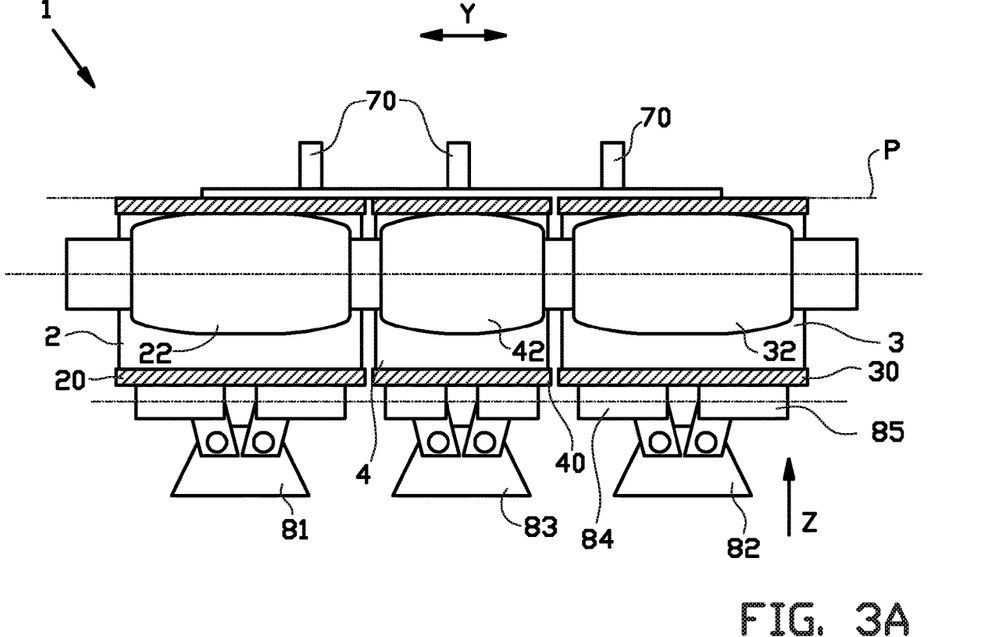
FIG. 3A shows a cross section of the transport device according the line III A-III A in FIG. 2A.
Figure 3B:
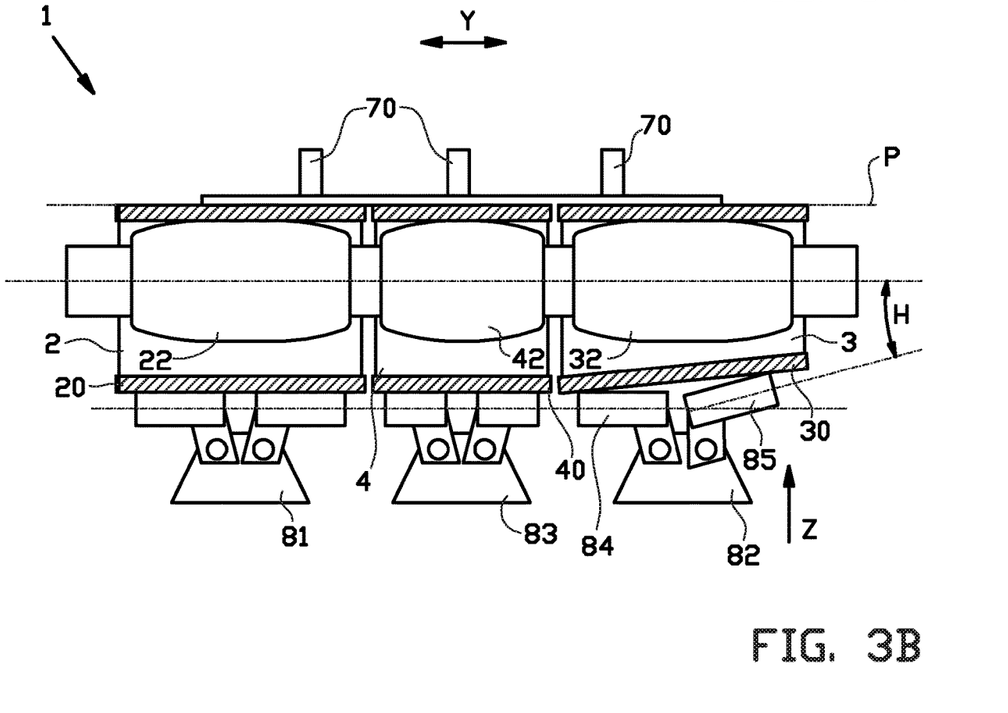
FIG. 3B shows a cross section of the transport device according to FIG. 3A while one of its belts of the transport device is being corrected for misaligned.

As further shown in FIG. 3A, the transport device 1 comprises a first side steering member 81, a second side steering member 82 and an intermediate steering member 83 for correcting misalignment of the first side conveyor 2, the second side conveyor 3 and the intermediate conveyor 4, respectively, in the lateral direction Y. In this exemplary embodiment, each steering member 81-83 comprises a first steering roller 84 and a second steering roller 85. The steering rollers 84, 85 are arranged for abutting and/or rolling along the lower run or return run of the respective belt 20, 30, 40. The first steering roller 84 and the second steering roller 85 are both adjustable in orientation. In particular, the first steering roller 84 and the second steering roller 85 can be adjusted between a level orientation in which the first steering roller 84 and the second steering roller 85 are coaxial and parallel to the combined conveying surface P, and a steering orientation in which one of the first steering roller 84 and the second steering roller 85 or both are arranged at an oblique angle H to the combined conveying surface P. Hence, friction between the steering member 81-83 and the respective belt 20, 30, 40 can be increased locally or at one side of the respective belt 20, 30, 40 to generate a centering effect or a steering effect.

In the level orientation, the axes of the steering rollers 84, 85 are parallel or substantially parallel to the lateral direction Y and/or the common rotation axis R of the drive pulleys 21, 31, 41, as shown in FIG. 2A.

Figure 4:
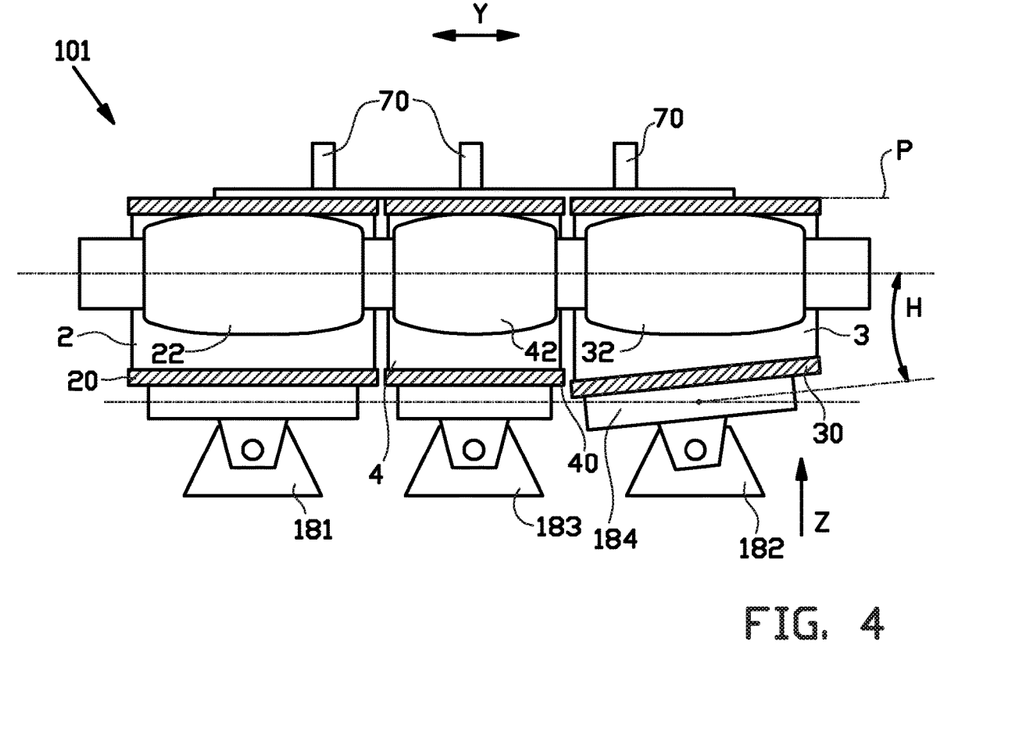
FIG. 4 shows a cross section of an alternative transport device according to a second exemplary embodiment of the invention.

FIG. 4 shows an alternative transport device 101 according to a second embodiment of the invention that differs from the previously discussed transport device 1 only in that each steering member 181, 182, 183 of the first side steering member 181, the second side steering member 182 and the intermediate steering member 183 comprises a single steering roller 184 instead of two steering rollers. Said single steering roller 184 that is adjustable between a level orientation in which the steering roller 184 extends parallel to the combined conveying surface P and a steering orientation in which the steering roller 184 extends at an oblique angle H to the combined conveying surface P.

As further shown in FIGS. 2A and 2B, each steering member 81, 82, 83 is movable in a tensioning direction Z transverse to the transport direction X and the lateral direction Y for variably tensioning the respective conveyor 2-4. In this exemplary embodiment, the tensioning direction Z is vertical or substantially vertical. Alternatively, the tensioning direction Z may be normal or substantially normal to the respective belt 20, 30, 40 at the position where the steering member 81, 82, 83 engages with the respective belt 20, 30, 40.

As shown in FIGS. 2A and 2B, the transport device 1 further comprises a misalignment detector 9 for detecting misalignment of at least one of the three conveyors 2-4. The misalignment detector 9 may comprises a toggle member 90 that is arranged in the lateral direction Y in the spacing distance S between two adjacent conveyors 2, 4 of the three conveyors 2-4. The toggle member 90 is arranged to be pinched between the belts 20, 40 as soon as the spacing distance S becomes smaller than the thickness of the toggle member 90 in the lateral direction Y. The toggle member 90 is then briefly pulled along by the moving belts 20, 40 before being toppled over. The toggle member 90 may be operationally connected to a switch 91 for detecting a change in the state, position and/or orientation of the toggle member 90, i.e. upright or toppled over, and sending a signal indicative of the change to the control unit 6. The control unit 6 may then activate or control one of the aforementioned steering members 81, 82, 83.

It will be clear to one skilled in the art that other means for detecting misalignment of the three conveyors 2-4 can be envisioned, such as optical sensors, a laser or other suitable optical, electronic or mechanical sensing means.

Figure 7:
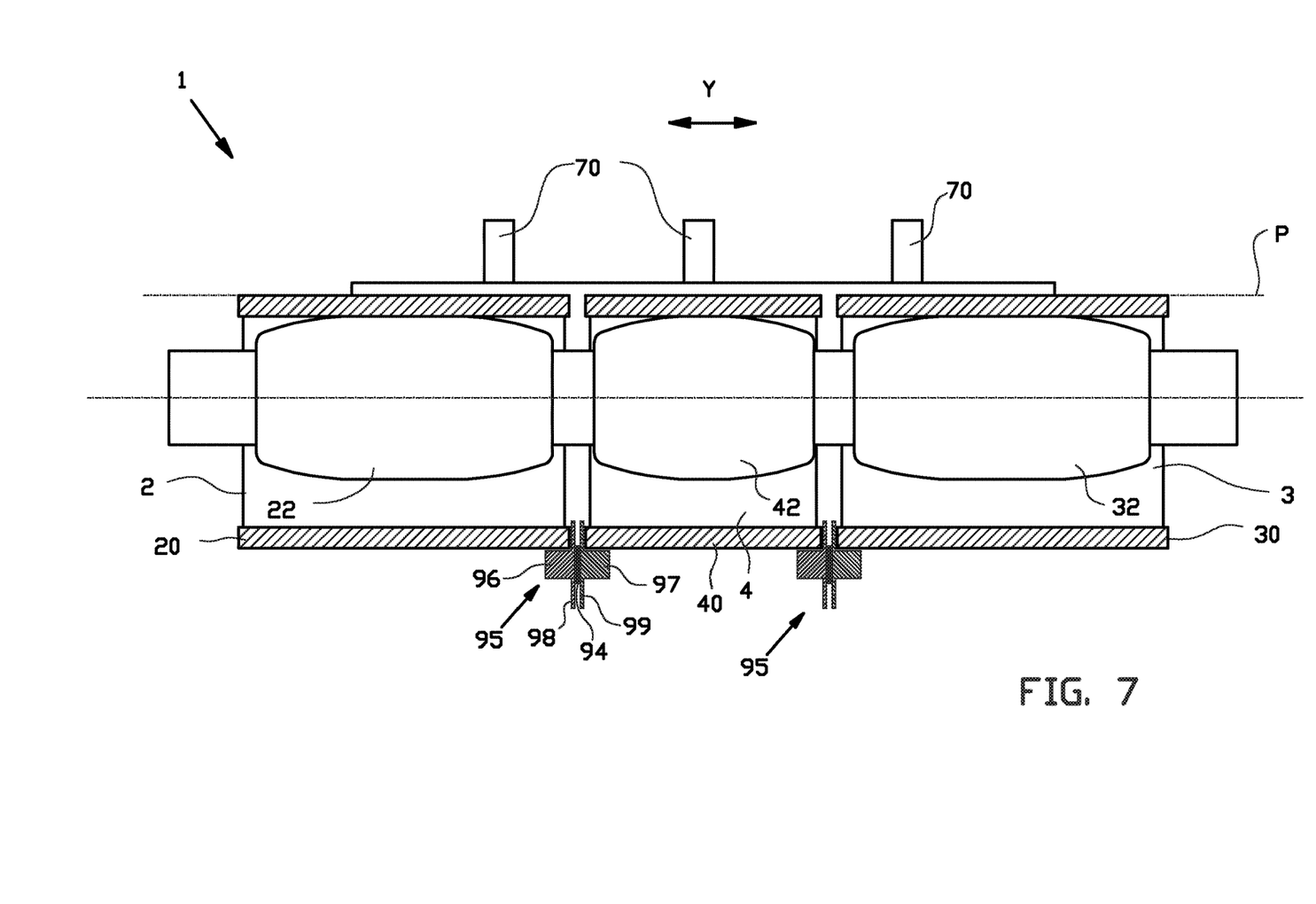
FIG. 7 shows a cross section of the transport device according to the line VII-VII in FIG. 2A.

FIG. 2A further shows edge guiding rollers 95 arranged in contact with the belts 20, 30, 40 near or just before the tail pulleys 22, 42, 32. The edge guiding rollers 95 may alternatively placed at another position along and in contact with the belts 20, 30, 40. As shown in more detail in FIG. 7, each edge guiding roller 95 comprises a first roller body 96 and a second roller body 97 coaxial to the first roller body 96 and independently rotatable with respect to said first roller body 96. The roller bodies 96, 97 are running against the belts 20, 30, 40, such that they are driven by the belts 20, 30, 40 at the same speed as the speed of the belt 20, 30, 40. Each edge guiding roller 95 further comprises a first disc 98 and a second disc 99 protruding from the first roller body 96 and the second roller body 97, respectively, and extending in the lateral direction Y between the respective conveyors 2-4. The first roller body 96 and the second roller body 97 may be spaced apart slightly by a spacing member, in particular a spacing ring 94. The edge guiding rollers 95 ensure correct tracking of the belts 20, 30, 40 by maintaining a certain distance between them.

In the aforementioned embodiments, the transport device 1 comprises a group of three conveyors 2-4. However, it will be clear that a group with more than three conveyors also falls within the scope of this invention, as long as the at least three conveyors 2-4 in the group form a common or combined conveying surface P for simultaneously supporting and conveying the same tire component T.

Figure 5:
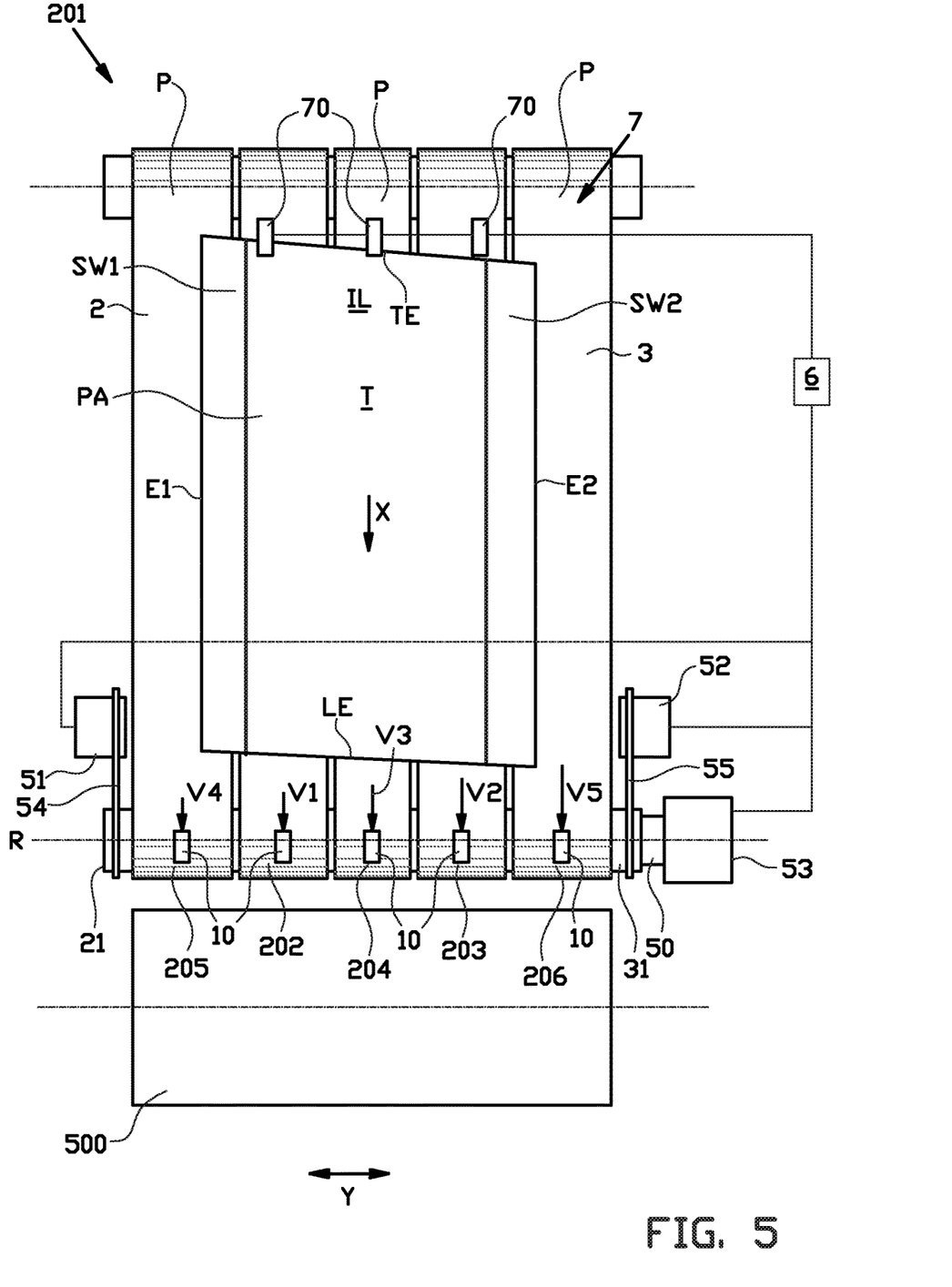
FIG. 5 shows a top view of a further alternative transport device according to a third exemplary embodiment of the invention.

For example, FIG. 5 shows a further alternative transport device 201 according to a third embodiment of the invention that differs from the previously discussed transport devices 1, 101 in that it comprises a first side conveyor 202, a second side conveyor 203, an intermediate conveyor 204 and one or more further conveyors 205, 206. The one or more further conveyors 205, 206 may be considered as additional side conveyors or additional intermediate conveyors. In the example as shown, there are five conveyors 202-206 in total. However, it will be clear that it is also possible to have four conveyors or more than five conveyors. Hence, it is equally possible to have an even number of conveyors or an uneven number of conveyors. The conveyors may be driven individually and/or independently by respective drive members, i.e. through additional drive belts connecting to each drive pulley individually. Alternatively, it can be envisioned that one or more of the further conveyors 205, 206 comprises a coupling device for selectively tagging along with the motion one of the adjacent conveyors, i.e. by increasing or decreasing a frictional or magnetic engagement between adjacent conveyors.

Like the three conveyors 2, 3, 4 of the transport device 1 according to the first embodiment of the invention, all five conveyors 202-206 of the transport device 201 according to the third embodiment of the invention are movable at different speeds V1-V5 with respect to each other in the transport direction X.

Figure 6:
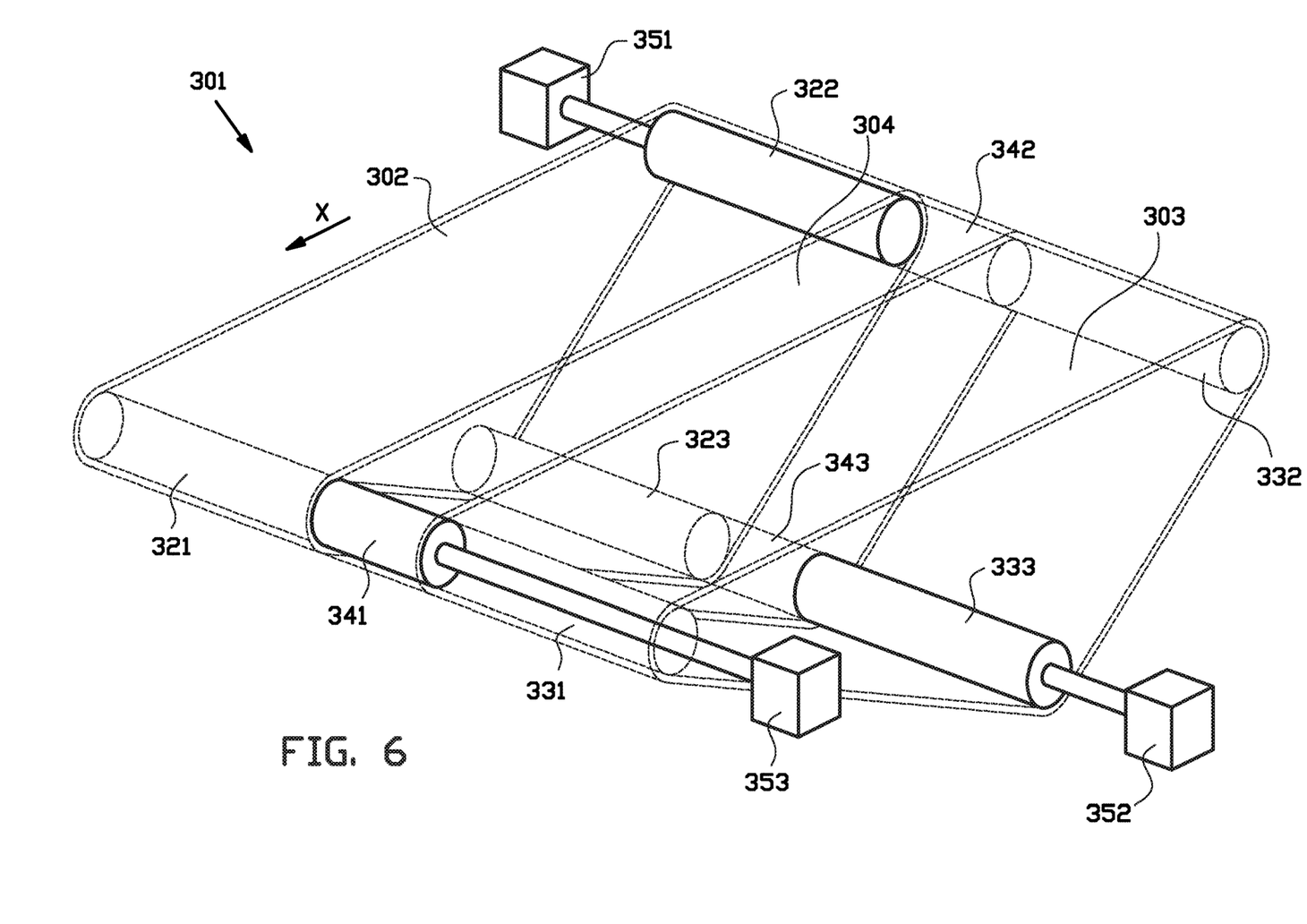
FIG. 6 shows an isometric view of a further alternative transport device according to a fourth exemplary embodiment of the invention.

FIG. 6 shows a transport device 301 according to a fourth exemplary embodiment of the invention, that differs from the previously discussed transport devices 1, 101, 201 in that the driven pulleys 322, 333, 341, shown schematically in solid lines, do not share a common rotation axis. Instead, the driven pulleys 322, 333, 341 may be formed by any combination of one or more of the head pulleys 321, 331, 341, one or more of the tail pulleys 322, 332, 342 and/or one or more of the further pulleys 323, 333, 343. The advantage having at least one driven pulley that is not aligned with the other driven pulleys is that the drive members 351, 352, 353 do not have to engage onto all of the driven pulleys at the same rotation axis. Instead, they can be placed where it is most convenient and/or such that the belts 302, 303, 304 can be placed as close as possible to each other. A method for transporting a tire component T in a transport direction X using the aforementioned transport device 1, 101, 201 will now be elucidated with reference to FIGS. 1-5.

FIG. 1 shows the situation in which the tire component T has been transported by the transport device 1 in the transport direction X into a position in which the full tire component T is supported on the combined conveying surface P. In particular, the three conveyors 2-4 simultaneously support the tire component T. As the tire component T is fed onto the transport device 1, the sensors 70 of the sensor unit 7 will detect the leading end LE, the trailing end TE, the first longitudinal side edge E1 and/or the second longitudinal side edge E2. In particular, the lengths L1, L2 are determined between the leading end LE and the trailing end TE at the first longitudinal side edge E1 and the second longitudinal side edge E2. In other words, the sensors 70 that are in line with the longitudinal side edges E1, E2 in the transport direction T detect when the leading end E1 passes the respective sensors 70 and when the trailing end E2 passes the respective sensors 70.

The control unit 6 is arranged for determining the lengths L1, L2 and/or for comparing said lengths L1, L2. Based on the difference D between the lengths L1, L2, the control unit 6 can select a correction mode and/or control one or more of the drive members 51, 52, 53 to move one or more of the conveyors 2-4 faster or slower than the other conveyors 2-4.

Hence, the method comprises the step of moving the intermediate conveyor 4, the first side conveyor 2 and the second side conveyor 3, 203 at different speeds V1, V2, V3 with respect to each other in the transport direction X. The different speeds V1, V2, V3 may be introduced when the tire component T is still fully supported on the combined conveying surface P, i.e. to reposition the first longitudinal edge E1 with respect to the second longitudinal side edge E2. Alternatively, the different speeds V1, V2, V3 may be introduced when the tire component T is already partially transferred from the transport device 1 to a downstream station, such as the drum 500. In particular, when varying the speeds of the conveyors 2-4 during the transfer, i.e. when the leading end LE of the tire component T is already applied to and retained by or adhered to the drum 500 and the trailing end TE of the tire component T is still adhered to the transport device 1, the tire component T can be stretched or compressed locally or in a specific region, i.e. only along one of the longitudinal side edges E1, E2, or along only a part of said one longitudinal side edge E1, E2.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 transport device
10 pressing roller
2 first side conveyor
20 belt
21 first side drive pulley
22 first side tail pulley
23 further pulley
3 second side conveyor
30 belt
31 second side drive pulley
32 second side tail pulley
33 further pulley
4 intermediate conveyor
40 belt
41 intermediate drive pulley
42 intermediate tail pulley
43 further pulley
50 shaft
51 first drive member
52 second drive member
53 third drive member
54 first drive belt
55 second drive belt
6 control unit
7 sensor unit
70 sensor
81 first side steering member
82 second side steering member
83 intermediate steering member
84 first steering roller
85 second steering roller
9 misalignment detector
90 toggle member
91 switch
94 spacing ring
95 edge guiding roller
96 first roller body
97 second roller body
98 first disc
99 second disc
101 alternative transport device
181 first side steering member
182 second side steering member
183 intermediate steering member
184 steering roller
201 further alternative transport device
202 first side conveyor 203 second side conveyor
204 intermediate conveyor
205 third side conveyor
206 fourth side conveyor
301 further alternative transport device
302 first side conveyor
321 first side drive pulley
322 first side tail pulley
323 further pulley
303 second side conveyor
331 second side drive pulley
332 second side tail pulley
333 further pulley
304 intermediate conveyor
341 intermediate drive pulley
342 intermediate tail pulley
343 further pulley
351 first drive member
352 second drive member
353 third drive member
400 applicator
500 drum
D length difference
E1 first longitudinal side edge
E2 second longitudinal side edge
H oblique angle
IL inner-liner
L1 first detected length
L2 second detected length
LE leading end
P combined conveying surface
PA pre-assembly
R common rotation axis
S spacing distance
SW1 first side wall
SW2 second side wall
T tire component
TE trailing end
V1 first speed
V2 second speed
V3 third speed
V4 fourth speed
V5 fifth speed
W1 first side width
W2 second side width
W3 intermediate width
X transport direction
Y lateral direction
Z tensioning direction

The invention claimed is:

1. A method for applying a tire component to a drum using an applicator, wherein the applicator comprises a transport device for transporting a tire component in a transport direction, wherein the transport device comprises at least three conveyors extending mutually parallel in the transport direction and side-by-side in a lateral direction perpendicular to the transport direction to form a combined conveying surface for simultaneously supporting and conveying the tire component in the transport direction, wherein the at least three conveyors comprise an intermediate conveyor, a first side conveyor on a first side of the intermediate conveyor in the lateral direction and a second side conveyor on a second side of the intermediate conveyor in the lateral direction, opposite to the first side, wherein the intermediate conveyor, the first side conveyor and the second side conveyor are movable at different speeds with respect to each other in a direction parallel to the transport direction, wherein the method comprises the steps of:
supporting and conveying the tire component simultaneously on the combined conveying surface of the at least three conveyors; and
moving the intermediate conveyor, the first side conveyor and the second side conveyor at different speeds with respect to each other in a direction parallel to the transport direction to at least partially correct a geometry of the tire component.

2. The method according to claim 1, wherein the transport device comprises a first drive member and a second drive member for driving the first side conveyor and the second side conveyor, respectively, in the transport direction.

3. The method according to claim 2, wherein the transport device comprises a third drive member for driving the intermediate conveyor in the transport direction.

4. The method according to claim 1, wherein the first side conveyor, the second side conveyor and the intermediate conveyor each comprise a belt.

5. The method according to claim 4, wherein the first side conveyor, the second side conveyor and the intermediate conveyor comprise a first side drive pulley, a second side drive pulley and an intermediate drive pulley, respectively, which are rotatable at different speeds with respect to each other.

6. The method according to claim 5, wherein the first side drive pulley, the second side drive pulley and the intermediate drive pulley are rotatable about a common rotation axis.

7. The method according to claim 5, wherein at least one of the first side drive pulley, the second side drive pulley and the intermediate drive pulley is rotatable about a different rotation axis than the other of the first side drive pulley, the second side drive pulley and the intermediate drive pulley.

8. The method according to claim 2, wherein the transport device comprises a control unit that is operationally connected to the first drive member and the second drive member and that is configured for controlling the first drive member and the second drive member to move the first side conveyor and the second side conveyor, respectively, at the different speeds.

9. The method according to claim 8, wherein the control unit is configured to operate in a first correction mode in which the first side conveyor moves faster than the second side conveyor in the transport direction and a second correction mode in which the second side conveyor moves faster than the first side conveyor in the transport direction.

10. The method according to claim 9, wherein the transport device comprises a third drive member for driving the intermediate conveyor in the transport direction, wherein the control unit is operationally connected to the third drive member, wherein the control unit is configured for controlling the third drive member to move the intermediate conveyor in the transport direction at a different speed with respect to at least one of the first side conveyor and the second side conveyor.

11. The method according to claim 10, wherein the control unit is configured to operate in a first correction mode in which the first side conveyor moves faster than the intermediate conveyor and the second side conveyor and a second correction mode in which the second side conveyor moves faster than the intermediate conveyor and the first side conveyor.

12. The method according to claim 11, wherein the intermediate conveyor moves faster than the second side conveyor in the first correction mode and faster than the first side conveyor in the second correction mode.

13. The method according to claim 10, wherein the control unit is configured to operate in a third correction mode in which both the first side conveyor and the second side conveyor move faster or slower than the intermediate conveyor.

14. The method according to claim 8, wherein the transport device further comprises a sensor unit for detecting the geometry of the tire component, wherein the control unit is operationally connected to the sensor unit and at least one drive member of the first drive member and the second drive member to control said at least one drive member in response to a signal received from the sensor unit to obtain a correction of the geometry of the tire component as detected.

15. The method according to claim 14, wherein the tire component has a first longitudinal side edge and a second longitudinal side edge, wherein the sensor unit is arranged for detecting lengths of the first longitudinal side edge and the second longitudinal side edge, wherein the control unit is configured for controlling said at least one drive member to correct a difference between the lengths of the first longitudinal side edge and the second longitudinal side edge as detected.

16. The method according to claim 14, wherein the sensor unit comprises a plurality of sensors for detecting the presence or absence of the tire component at the location of the respective sensor.

17. The method according to claim 1, wherein the transport device further comprises one or more pressing devices arranged above the at least three conveyors for pressing the tire component onto said at least three conveyors.

18. The method according to claim 17, wherein the one or more pressing devices comprises one or more pressing rollers.

19. The method according to claim 17, wherein each pressing device of the one or more pressing devices is arranged for pressing the tire component onto at least one conveyor of said at least three conveyors with an individually adjustable pressing force.

20. The method according to claim 1, wherein the first side conveyor, the second side conveyor and the intermediate conveyor have a first side width, a second side width and an intermediate width, respectively, in the lateral direction, wherein the intermediate width is smaller than the first side width and the second side width.

21. The method according to claim 1, wherein the first side conveyor, the second side conveyor and the intermediate conveyor are spaced apart in the lateral direction over a spacing distance of less than twenty millimeters.

22. The method according to claim 1, wherein the first side conveyor, the second side conveyor and the intermediate conveyor each comprise a crowned pulley.

23. The method according to claim 1, wherein the transport device further comprises a first side steering member, a second side steering member and an intermediate steering member for correcting misalignment of the first side conveyor, the second side conveyor and the intermediate conveyor, respectively, in the lateral direction.

24. The method according to claim 23, wherein each steering member of the first side steering member, the second side steering member and the intermediate steering member comprises a first steering roller and a second steering roller, wherein the first steering roller, the second steering roller or both are adjustable between a level orientation in which the first steering roller and the second steering roller are coaxial and parallel to the combined conveying surface, and a steering orientation in which one of the first steering roller and the second steering roller or both are arranged at an oblique angle to the combined conveying surface.

25. The method according to claim 23, wherein each steering member of the first side steering member, the second side steering member and the intermediate steering member comprises a steering roller that is adjustable between a level orientation in which the steering roller extends parallel to the combined conveying surface and a steering orientation in which the steering roller extends at an oblique angle to the combined conveying surface.

26. The method according to claim 23, wherein each steering member of the first side steering member, the second side steering member and the intermediate steering member is movable in a tensioning direction transverse to the transport direction and the lateral direction for variably tensioning the respective conveyor.

27. The method according to claim 23, wherein the transport device further comprises a misalignment detector for detecting misalignment of at least one conveyor of the at least three conveyors.

28. The method according to claim 1, wherein the at least three conveyors comprises one or more further conveyors, wherein the first side conveyor, the second side conveyor, the intermediate conveyor and the one or more further conveyors are movable at different speeds with respect to each other in a direction parallel to the transport direction.

29. The method according to claim 1, wherein the method further comprises the steps of:
moving the first side conveyor faster than the second side conveyor in the transport direction in a first correction mode; and
moving the second side conveyor faster than the first side conveyor in the transport direction in a second correction mode.

30. The method according to claim 29, wherein the method further comprises the steps of:
moving the first side conveyor faster than the intermediate conveyor in the transport direction in the first correction mode; and
moving the second side conveyor faster than the intermediate conveyor in the transport direction in the second correction mode.

31. The method according to claim 30, wherein the method further comprises the steps of:
moving the intermediate conveyor faster than the second side conveyor in the first correction mode; and
moving the intermediate conveyor faster than the first side conveyor in the second correction mode.

32. The method according to claim 1, wherein the method further comprises the step of:
moving both the first side conveyor and the second side conveyor faster or slower than the intermediate conveyor in a third correction mode.

33. A transport device for transporting a tire component in a transport direction, wherein the transport device comprises at least three conveyors extending mutually parallel in the transport direction and side-by-side in a lateral direction perpendicular to the transport direction to form a combined conveying surface for conveying the tire component in the transport direction, wherein the at least three conveyors comprise an intermediate conveyor, a first side conveyor on a first side of the intermediate conveyor in the lateral direction and a second side conveyor on a second side of the intermediate conveyor in the lateral direction, opposite to the first side, wherein the intermediate conveyor, the first side conveyor and the second side conveyor are movable at different speeds with respect to each other in a direction parallel to the transport direction, wherein the first side conveyor, the second side conveyor and the intermediate conveyor each comprise a belt and a first side drive pulley, a second side drive pulley and an intermediate drive pulley, respectively, which are rotatable at different speeds with respect to each other, wherein the first side drive pulley, the second side drive pulley and the intermediate drive pulley are rotatable about a common rotation axis, wherein the transport device further comprises a shaft for carrying the first side drive pulley, the second side drive pulley and the intermediate drive pulley at the common rotation axis, wherein one drive pulley of the first side drive pulley, the second side drive pulley and the intermediate drive pulley is fixed to the shaft to rotate together with said shaft, wherein the other two drive pulleys of the first side drive pulley, the second side drive pulley and the intermediate drive pulley are rotatable with respect to the shaft.

34. The transport device according to claim 33, wherein the other two drive pulleys are cylindrical sleeves that fit concentrically around the shaft.

35. The transport device according to claim 33, wherein the transport device comprises a first drive member, a second drive member and a third drive member for driving the first side conveyor, the second side conveyor and the intermediate conveyor, respectively, in the transport direction, wherein the shaft is arranged for connecting one drive member of the first drive member, the second drive member and the third drive member to one drive pulley of the first side drive pulley, the second side drive pulley and the intermediate drive pulley.

36. The transport device according to claim 35, wherein the other two drive members of the first drive member, the second drive member and the third drive member are connected to the other two drive pulleys from a position external to said shaft.

37. The transport device according to claim 33, wherein the intermediate drive pulley is fixed to the shaft to rotate together with the shaft.

* * * * *